United States Patent [19]

Kondo

[11] Patent Number: 5,345,842
[45] Date of Patent: Sep. 13, 1994

[54] CONTROL DEVICE OF A TRANSMISSION FLUID PRESSURE BY TEMPORARY REDUCTION IN NEGATIVE FEEDBACK CONTROL OF SPEED FOR AN ELECTRONICALLY CONTROLLED AUTOMATIC TRANSMISSION

[75] Inventor: Shigeki Kondo, Himeji, Japan

[73] Assignee: Mitsubishi Denki Kabushiki Kaisha, Tokyo, Japan

[21] Appl. No.: 93,141

[22] Filed: Jul. 19, 1993

Related U.S. Application Data

[63] Continuation of Ser. No. 853,202, Mar. 18, 1992, abandoned.

[30] Foreign Application Priority Data

Apr. 15, 1991 [JP] Japan ............... 3-082249

[51] Int. Cl.$^5$ ........................... F16H 5/64
[52] U.S. Cl. ................. 477/120; 364/424.1; 477/154
[58] Field of Search ........... 74/844, 856, 861, 862, 74/866; 364/424.1

[56] References Cited

U.S. PATENT DOCUMENTS

| | | | |
|---|---|---|---|
| 3,942,393 | 3/1976 | Furster et al. | 74/866 |
| 4,949,595 | 8/1990 | Shimanaka | 74/867 X |
| 4,955,259 | 9/1990 | Narita | 74/866 |
| 5,062,050 | 10/1991 | Petzold et al. | 74/866 X |
| 5,079,971 | 1/1992 | Yoshimura et al. | 74/844 X |
| 5,093,789 | 3/1992 | Yoshimura et al. | 74/866 X |
| 5,213,012 | 5/1993 | Suzuki | 74/866 |
| 5,235,877 | 8/1993 | Takahashi et al. | 74/866 |

FOREIGN PATENT DOCUMENTS 63-54937 10/1988 Japan .

Primary Examiner—Leslie A. Braun
Assistant Examiner—Khoi Q. Ta
Attorney, Agent, or Firm—Sughrue, Mion, Zinn, Macpeak & Seas

[57] ABSTRACT

A control device of a transmission fluid pressure for an electronically controlled automatic transmission comprising: a rotational number change detecting means for detecting a rotational number change of either an engine or a rotational member of an automatic transmission; a transmission fluid pressure controlling means for arbitrarily controlling a transmission fluid pressure for a transmission fluid pressure controlling device of the automatic transmission; and a control device for controlling a target value of the transmission fluid pressure for the transmission fluid pressure controlling device by a negative feed back control dependent at least on the rotational number change of either the engine or the rotational member of the automatic transmission, said control device determining whether the engine is in a constant speed or acceleration mode, and temporarily discontinuing the negative feed back control or reducing a control quantity thereof when the engine shifts from a deceleration/closed throttle mode to a constant speed or acceleration mode while the transmission fluid pressure controlling means is controlling the transmission fluid pressure for changing the gear in which the transmission to which the engine is coupled.

2 Claims, 5 Drawing Sheets

CONTROL DEVICE OF A TRANSMISSION FLUID PRESSURE BY TEMPORARY REDUCTION IN NEGATIVE FEEDBACK CONTROL OF SPEED FOR AN ELECTRONICALLY CONTROLLED AUTOMATIC TRANSMISSION

This is a continuation of application No. 07/853,202 filed Mar. 18, 1992, now abandoned.

BACKGROUND OF THE INVENTION

1. Field of the Invention

This invention relates to a control device of a transmission fluid pressure for an electronically controlled automatic transmission wherein a shift shock in an automatic transmission for a vehicle is alleviated.

2. Discussion of Background

FIG. 1 is a block diagram showing a control device of an automatic transmission for a vehicle of the present invention, mentioned later, and a conventional example shown, for instance, in Japanese Unexamined Patent Publication No. 246653/1987. Explanation will be given to construction of a conventional example utilizing FIG. 1. In FIG. 1, a reference numeral 1 designates an engine, 2, an automatic transmission, 3, a rotational speed sensor for detecting either one of speeds of the engine 1 and the automatic transmission 2, 4, a control device for calculating a rotational speed change from a rotational number measured by the rotational speed sensor 3, and instructing a transmission fluid pressure based on the calculation, 5, a transmission fluid pressure controlling means for controlling a transmission fluid pressure in gear changing, 6, a pressure transfer means for applying the transmission fluid pressure which is instructed by the transmission fluid pressure controlling means, to friction elements of the automatic transmission 2.

Next, explanation will be given to the operation. When a gear ratio of the automatic transmission 2 is to be shifted, a rotational number, which is read from the rotational number sensor 3 of either the engine 1 and/or the automatic transmission 2, is inputted to the control device 4. Control device 4 which calculates a rotational number change by sampling the rotational number over time. Control device 4 takes the rotational number change from the read value, compares it with a target value, and instructs a transmission fluid pressure to the transmission pressure controlling means 5 based on the comparison result.

The instructed transmission fluid pressure is transferred to the friction elements such as a clutch or a brake of the automatic transmission 2 through the pressure transfer means 6 by the transmission fluid pressure controlling means 5, and performs engaging of the friction elements.

In this case, for instance, when the procedure of gear changing (e.g., changing from second gear to third gear) is fast, and the rotational number change is large, the control device decreases the transmission fluid pressure and thereby retards the speed of the engagement. Conversely, when the procedure of gear changing is slow and the rotational number change is small, the control device increases the transmission fluid pressure and thereby accelerates the speed of the engagement.

Explanation will be given to the operation utilizing FIGS. 4 and 5. FIG. 4 is a flow chart showing an operational flow of a conventional control device of an automatic transmission, and FIG. 5, a change of a rotational number in the gear changing of a turbine shaft which is one of rotational bodies of the automatic transmission 2.

First, in step S1, the operation calculates a vehicle speed by respective sensors installed on a vehicle. In step S2, the operation reads a throttle opening degree from a throttle sensor. In step S3, the operation calculates a turbine shaft rotational number and a turbine shaft rotational number change. In step S4, the operation determines whether the engine is in gear changing by means of the control device 4. When the operation determines that the engine is in gear changing, as a result of the determination, the operations jumps to step S7 from Y side of step S4.

Furthermore, when the operation determines that the engine is not in gear changing in step S4, the operation proceeds to step S5 from N side of step S4. In step S5, the operation determines whether the engine is to perform the gear changing or not. When the engine is not is to perform the gear changing, the operation returns to step S1 from N side of step S5. Conversely, when the engine is to perform the gear changing in step S5, that is, when the engine starts the gear changing, the operation proceeds to step S6. In step S6, the operation switches shift steps, and proceeds to step S7.

In step S7, the operation performs a treatment in case that the operation determines that the engine is in the gear changing, or that the engine is to perform the gear changing (begins to perform the gear changing) in step S5. After the operation switches the shift steps in step S6, the operation calculates a target turbine rotational number change from a vehicle speed or the like, and compares it with the turbine shaft rotational number change obtained in step S3. In step S8, the operation outputs a clutch/brake transmission fluid pressure in the gear changing by performing a negative feed back control. In step S9, when the gear changing is not finished, the operation returns to step S1. When the gear changing is finished, the operation performs a gear changing finish treatment in step S10.

At this point, a more detailed explanation will be given as to the negative feed back control process and the role of the clutch/brake fluid pressure in the gear changing. In FIG. 5, in an engine state wherein the gear changing is proceeding, a target turbine rotational number change 17, is calculated, and the actual turbine rotational number change determined. The two valves are compared. If the actual turbine rotational number change is shifted to a direction 18 which is inclined more gently, the control device controls the actual turbine rotational number change to the target turbine rotational number change 19 by increasing the transmission fluid pressure. Conversely, when the actual turbine rotational number change is shifted to a direction 20 which is inclined more steeply, the control device makes the actual turbine rotational number change to the target turbine rotation number change 21 by decreasing the transmission fluid pressure, to thereby retard the gear changing. Because fluid pressure affects the clutch, the clutch affects the planetary gear, and the planetary gear in turn affects turbine rotation, it is in this fashion that the negative feed back is performed.

Since the conventional control device of the automatic transmission for an automobile is constructed as above, as shown in FIG. 6, when the engine shifts from a state of POWER OFF wherein the engine is in a deceleration/closed throttle mode during which the engine functions as a dynamic brake to a state of POWER ON when the engine is in a constant speed or acceleration mode the turbine shaft rotational number begins to increase after a time lag (point b). By this increase the transmission fluid pressure rapidly increases since the negative feed back control is operated. After a certain time, the fluid pressure surpasses a speed increasing power of the engine, and the turbine shaft rotational speed change rapidly changes, thereby generating a shock at point c.

SUMMARY OF THE INVENTION

It is an object of the present invention to solve above problems. It is an object of the present invention to provide a control device of a transmission fluid pressure for an electronically controlled automatic transmission capable of alleviating a shock in the POWER OFF/-POWER ON shifting time in the gear changing.

According to an aspect of the present invention, there is provided a control device of a transmission fluid pressure for an electronically controlled automatic transmission comprising: a rotational number change detecting means for detecting a rotational number change of either an engine or a rotational member of an automatic transmission; a transmission fluid pressure controlling means for arbitrarily controlling a transmission fluid pressure for a transmission fluid pressure controlling device of the automatic transmission; and a control device for controlling a target value of the transmission fluid pressure for the transmission fluid pressure controlling device by a negative feed back control dependent at least on the rotational number change of either the engine or the rotational member of the automatic transmission, said control device determining whether the engine is in a constant speed or acceleration mode, and temporarily discontinuing the negative feed back control or reducing a control quantity thereof when the engine shifts from a deceleration/-closed throttle mode to a constant speed or acceleration mode while the transmission fluid pressure controlling means is controlling the transmission fluid pressure for changing the gear in which the transmission to which the engine is coupled.

In this invention, when the control device detects that the engine is shifted from a state of POWER OFF wherein the engine is in a deceleration/closed throttle mode, to a state of POWER ON wherein the engine is a constant speed or acceleration mode, the control device prevents a rapid increase of the transmission fluid pressure by discontinuing the negative feed back control or by reducing a control quantity thereof, thereby smoothly performing the engagement of clutch/brake.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Explanation will be given to embodiments of a control device of a transmission fluid pressure for an electronically controlled automatic transmission of the present invention as follows.

Figure 1:
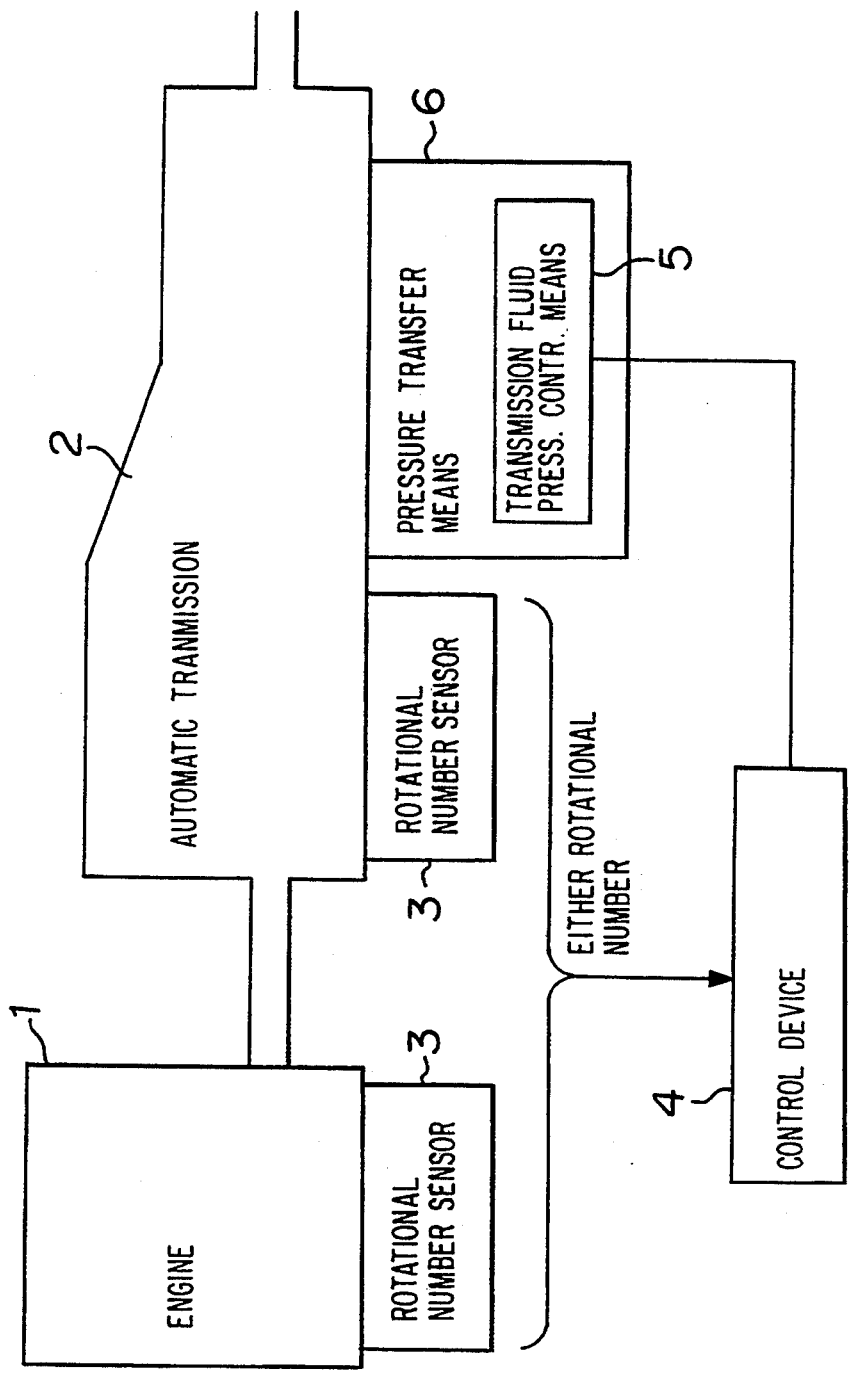
FIG. 1 is a block diagram of an embodiment of a control device a transmission fluid pressure for an electronically controlled automatic transmission according to the present invention.

FIG. 1 is a block diagram showing construction of an embodiment thereof, which is already explained in the conventional example, and further explanation is omitted. In this invention, control behavior of the control device 4 is different from that in the conventional example.

Figure 2:
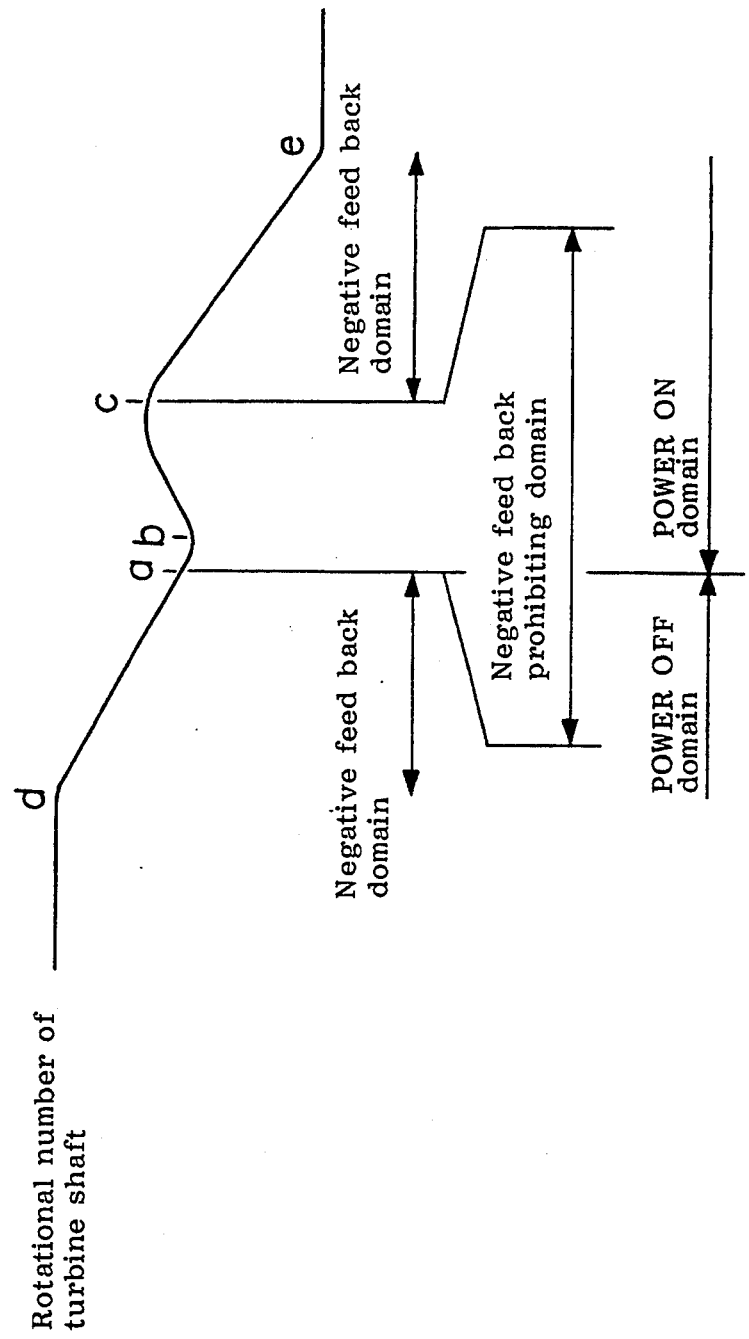
FIG. 2 is an explanatory diagram showing a behavior of change of a turbine rotation of the automatic transmission of the embodiment of FIG. 1.

Next, explanation will be given to the operation. FIG. 2 is a diagram showing a behavior of change of turbine rotation of the automatic transmission 2. In FIG. 2, the gear changing in POWER OFF state is initiated at point d, and the engine is switched to POWER ON state at point a. At point c, wherein the turbine shaft revolutional number decreases again, after passing through point b wherein the turbine shaft rotational number begins to increase. During the period from point a to point c, the negative feed back control is discontinued, and the transmission fluid pressure corresponding to the throttle opening degree is applied to the transmission fluid pressure control device by which the increase of the turbine shaft rotation is gradually retarded, and an absolute value of the turbine shaft rotational number change is reduced. When the turbine shaft rotational number change becomes negative again from positive at point c, the negative feed back control is restarted.

In FIG. 2, the reason the turbine shaft rotational number begins to increase at point b after the engine shifts from POWER OFF to POWER ON, is as follows. In the gear changing in POWER OFF, the gear changing proceeds even if the clutch/brake mechanism, which acts as a friction element of the automatic transmission 2, does not transmit considerable rotational force. Therefore the transmission fluid pressure can stay low. When the engine shifts to POWER ON wherein considerable transfer of the rotational force of the clutch/brake mechanism is necessary, the clutch/brake mechanism begins to slip.

The transmission fluid pressure, which is controlled by the negative feed back control, becomes much higher than a transmission fluid pressure necessary for engaging the clutch/brake. Therefore, the control device maintains a pertinent transmission fluid pressure by controlling it by an open loop control during that period. Furthermore, the negative feed back control is restarred at a time point wherein the successive engagement is determined to start again, and the turbine shaft rotational number change becomes negative.

Figure 3:
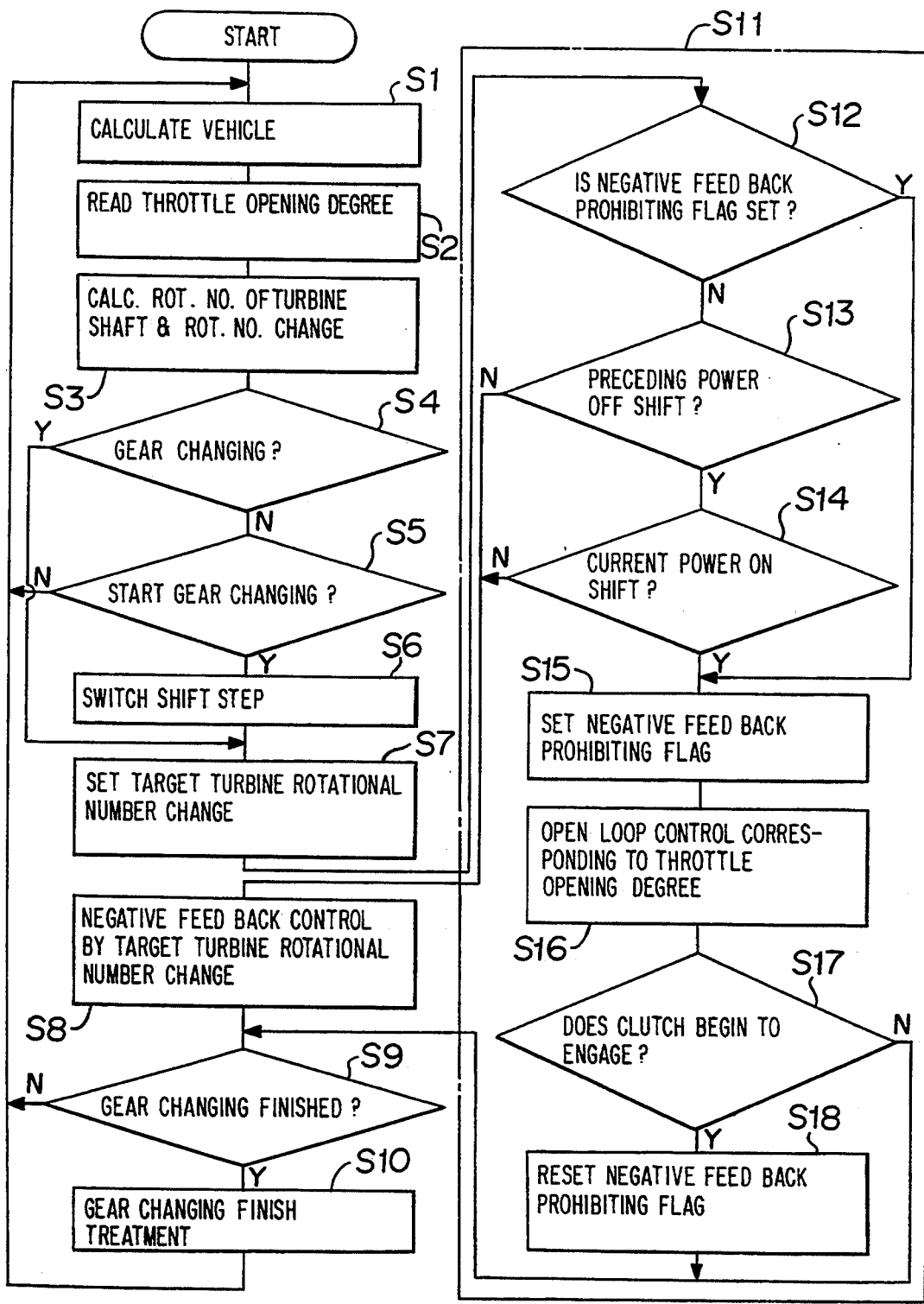
FIG. 3 is a flow chart showing an operational flow of the transmission fluid pressure control of the embodiment of FIG. 1.
Figure 4:
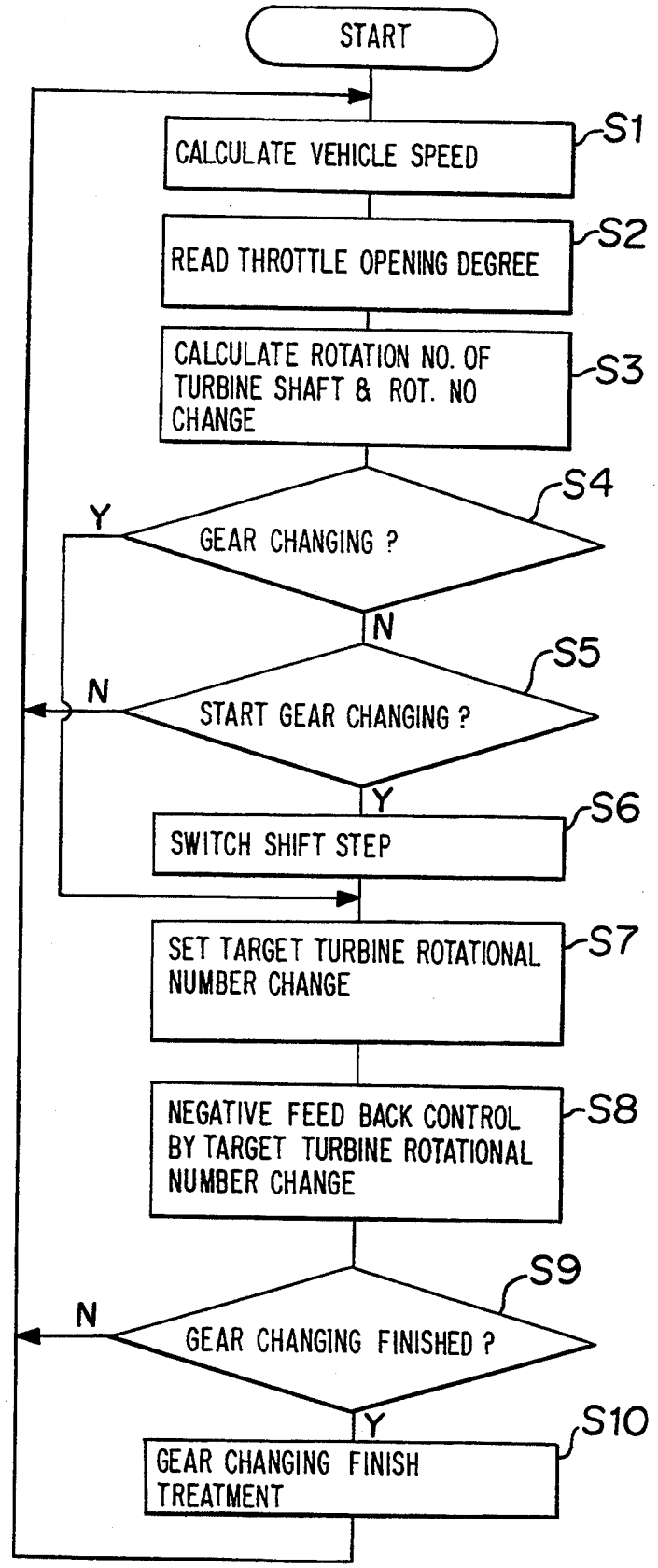
FIG. 4 is a flow chart showing an operational flow of the transmission fluid pressure control in the automatic transmission of a conventional control device for an automatic transmission for a vehicle.
Figure 5:
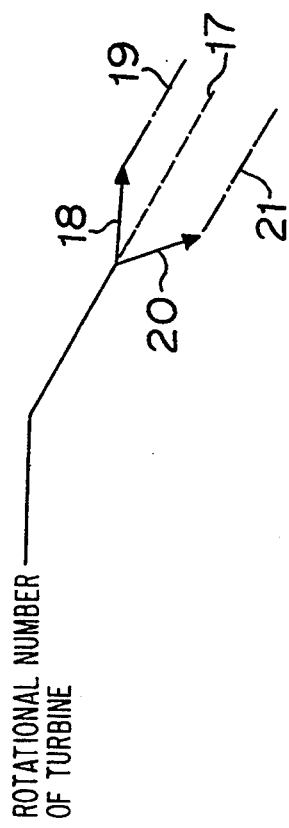
FIG. 5 is an explanatory diagram showing a behavior of turbine rotation showing a negative feed back control in the speed changing by the control device of an automatic transmission for a vehicle of FIG. 4.
Figure 6:
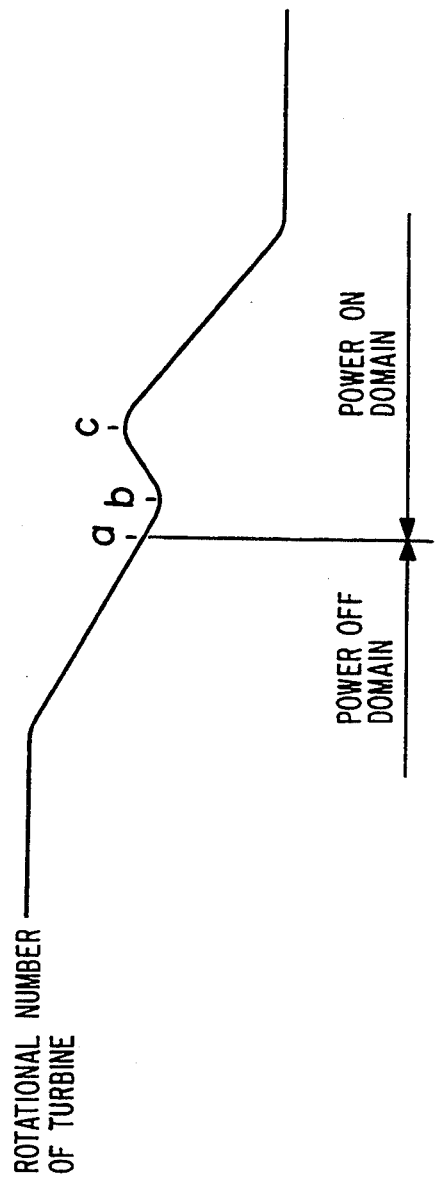
FIG. 6 is an explanatory diagram showing a behavior of change of turbine rotation of the control device of an automatic transmission for a vehicle of FIG. 4.

FIG. 3 is a flow chart of these treating steps. In FIG. 3, steps S1 to S10 are the same as in FIG. 4 of the conventional example. In FIG. 3, a control routine of step S11 is added between steps S7 and S8 of FIG. 4, which is a characterizing parts of the present invention.

In the flow chart of FIG. 3, in step S7, the operation calculates the target turbine rotational number change. In step S12, when a negative feed back prohibiting flag is set, the operation jumps to step S15 from Y side of step 12. When the negative feed back prohibiting flag is not set in step S12, the operation proceeds to step S13 from N side of step S12.

In step S13, when the engine is not in a preceding POWER OFF shifting state, the operation returns to the routine of step S8 from N side of step S13. When the engine is in the preceding POWER OFF shifting state, the operation proceeds to step S14 from Y side of step S13.

In step S14, when the engine is in a current POWER ON shifting state, that is, when the engine is shifting from the POWER OFF state to the POWER ON state, the operation proceeds to step S15. In step S15, the operation sets a negative feed back prohibiting flag, thereby prohibiting the negative feed back control. In S16, the operation outputs a minimum transmission fluid pressure capable of proceeding the speed changing corresponding with the throttle opening degree during that period. This state corresponds with from point a to point c in FIG. 2.

In step S17, when the operation determines a starting point of reengaging the clutch at point c, that is, when the turbine shaft rotational number change becomes negative, the operation proceeds to step S18. In step S18, the operation resets the negative feed back prohibiting flag, and the negative feed back control is restarted. That is, the operation returns to step S9.

In the above embodiment, the throttle opening degree is utilized for the transmission fluid pressure control during that period prohibiting the negative feed back. However, the transmission fluid pressure control may be performed by information of volumetric efficiency which can predict the output of the engine.

Furthermore, it is not always necessary to prohibit the negative feed back control. A gain of the negative feed back control during that period may be reduced compared with that in a normal running of the engine. Upper and lower limits may be provided for transmission fluid pressure correction quantity during that period.

Furthermore, in the above embodiment, the period for prohibiting the negative feed back control is determined as from when the turbine shaft rotational number increases after the engine has shifted to POWER ON, to when it begins to decrease. However, the period for prohibiting the negative feed back control may be determined as from a certain time after the engine has shifted to POWER ON, to when the turbine shaft rotational number begins to decrease for the first time.

Furthermore, in the above embodiment, the turbine shaft rotational number is utilized for the rotational number for control. However, it may be substituted by the engine revolutional number.

As stated above, according to the present invention, since the negative feed back control is prohibited or reduced during the period when the engine shifts to POWER ON from POWER OFF, the shock is not generated in the period.

Furthermore, fluctuation of the transmission fluid pressure which begins with the shifting of POWER OFF to POWER ON, is minimized, and the gain of the feed back control can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for controlling the rotational speed of a rotational member of the automatic transmission, comprising:

a rotational number change detecting means for detecting a rotational number change of a rotational member of at least one of an engine and the automatic transmission;

a transmission fluid pressure controlling means for arbitrarily controlling a transmission fluid pressure; and a control means for controlling the transmission fluid pressure controlling means by a negative feed back control dependent at least on the rotational number change of the rotational member of at least one of the engine and the automatic transmission, said control means determining whether the engine is in one of a constant speed mode and an acceleration mode, and temporarily reducing a control quantity of the negative feed back control when the engine shifts from a deceleration/closed throttle mode to one of a constant speed mode and an acceleration mode while the transmission fluid pressure controlling means is controlling the transmission fluid pressure for changing a gear in which the transmission to which the engine is coupled is operating.

2. A control system as recited in claim 1, wherein, when said control device temporarily reduces the negative feed back control, said control means temporarily discontinues the negative feed back control.

* * * * *